(12) United States Patent
Dorsh

(10) Patent No.: US 7,756,400 B2
(45) Date of Patent: Jul. 13, 2010

(54) OPTICALLY WRITING IMAGE DATA FILES AND THUMBNAIL IMAGES CORRESPONDING THERETO TO OPTICAL DISC

(75) Inventor: Cari Dorsh, McMinnville, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1751 days.

(21) Appl. No.: 10/899,197

(22) Filed: Jul. 25, 2004

(65) Prior Publication Data

US 2006/0018632 A1 Jan. 26, 2006

(51) Int. Cl.
- *H04N 5/00* (2006.01)
- *G06F 11/30* (2006.01)
- *G11B 5/09* (2006.01)
- *G11B 7/00* (2006.01)
- *G11B 7/24* (2006.01)
- *G11B 7/26* (2006.01)

(52) U.S. Cl. ............... 386/117; 386/125; 386/126; 369/52.1; 369/53.22; 369/53.3; 369/53.37; 369/273; 369/275.1; 369/275.3; 713/193

(58) Field of Classification Search ............ 386/117, 386/125, 126; 347/224; 369/52.1, 53.22, 369/53.3, 53.37, 273, 275.1, 275.3; 713/193; G9B/19.001, 27.019, 27.033
See application file for complete search history.

(56) References Cited

U.S. PATENT DOCUMENTS

| | | | | |
|---|---|---|---|---|
| 6,574,424 | B1 * | 6/2003 | Dimitri et al. | 386/125 |
| 7,095,429 | B2 * | 8/2006 | Kwasny et al. | 347/224 |
| 2002/0122378 | A1 * | 9/2002 | Kubo | 369/273 |
| 2003/0108708 | A1 | 6/2003 | Anderson et al. | |
| 2004/0145988 | A1 * | 7/2004 | Watanabe | 369/53.22 |
| 2004/0146001 | A1 * | 7/2004 | Koll et al. | 369/275.1 |
| 2004/0172548 | A1 * | 9/2004 | Anderson et al. | 713/193 |
| 2005/0058044 | A1 * | 3/2005 | Koegler et al. | 369/53.22 |
| 2005/0124342 | A1 * | 6/2005 | Wu et al. | 455/435.2 |

FOREIGN PATENT DOCUMENTS

JP     2002203321     7/2002

* cited by examiner

*Primary Examiner*—Thai Tran
*Assistant Examiner*—Syed Y Hasan

(57) ABSTRACT

A method of an embodiment of the invention optically writes a plurality of image data files on an optically writable data side of an optical disc. The method optically marks a plurality of thumbnail images on an optically writable label side of the optical disc. Each thumbnail image corresponds to one of the image data files.

42 Claims, 5 Drawing Sheets

US 7,756,400 B2

OPTICALLY WRITING IMAGE DATA FILES AND THUMBNAIL IMAGES CORRESPONDING THERETO TO OPTICAL DISC

BACKGROUND

Digital cameras have recently become popular with both home and business users, as they have come down in price, and as users have gained experience with them. A digital camera generally varies from a regular camera in that instead of taking pictures on film that must be developed, it takes pictures that are saved as image data files within the camera. The image data files may be saved on internal memory of the digital camera, or on a removable memory card or other computer-readable media that can be removed from the camera and inserted into a corresponding slot of a computer or a device attached to the computer. The image data files are thus usually uploaded to a computer, where the user may manipulate them, and ultimately may print them on a printer.

Having to upload image data files from a digital camera to a computer can be inconvenient, however. A user may first have to turn on the computer, wait for it to boot, and then run the appropriate computer program or programs to simply retrieve the image data files from the digital camera and print them on a printer. Therefore, some printers now have the capability of being able to directly connect to digital cameras, or have the capability of being able to read image data files from memory cards inserted into them. In the latter case, for instance, a user removes the memory card storing the image data files from the digital camera and inserts it into the printer to print the image data files on media, without having to employ a computer.

While such printers enable users of digital cameras to print image data files on media without using a computer, the users still have to resort to a computer in order to archive, or store indefinitely, the image data files in electronic form. The image data files may be stored on internal memory of a digital camera, such that the image data files need to be erased from the internal memory for the digital camera to be able to capture new pictures. Even if the image data files are stored on a removable memory card, such memory cards are expensive and therefore not a realistic option for archiving image data files. Furthermore, the user may find organizing such memory cards inconvenient, and therefore may not know which image data files are stored on which card.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Image Data Files and Thumbnail Images Without a General-Purpose Computer

Figure 1:
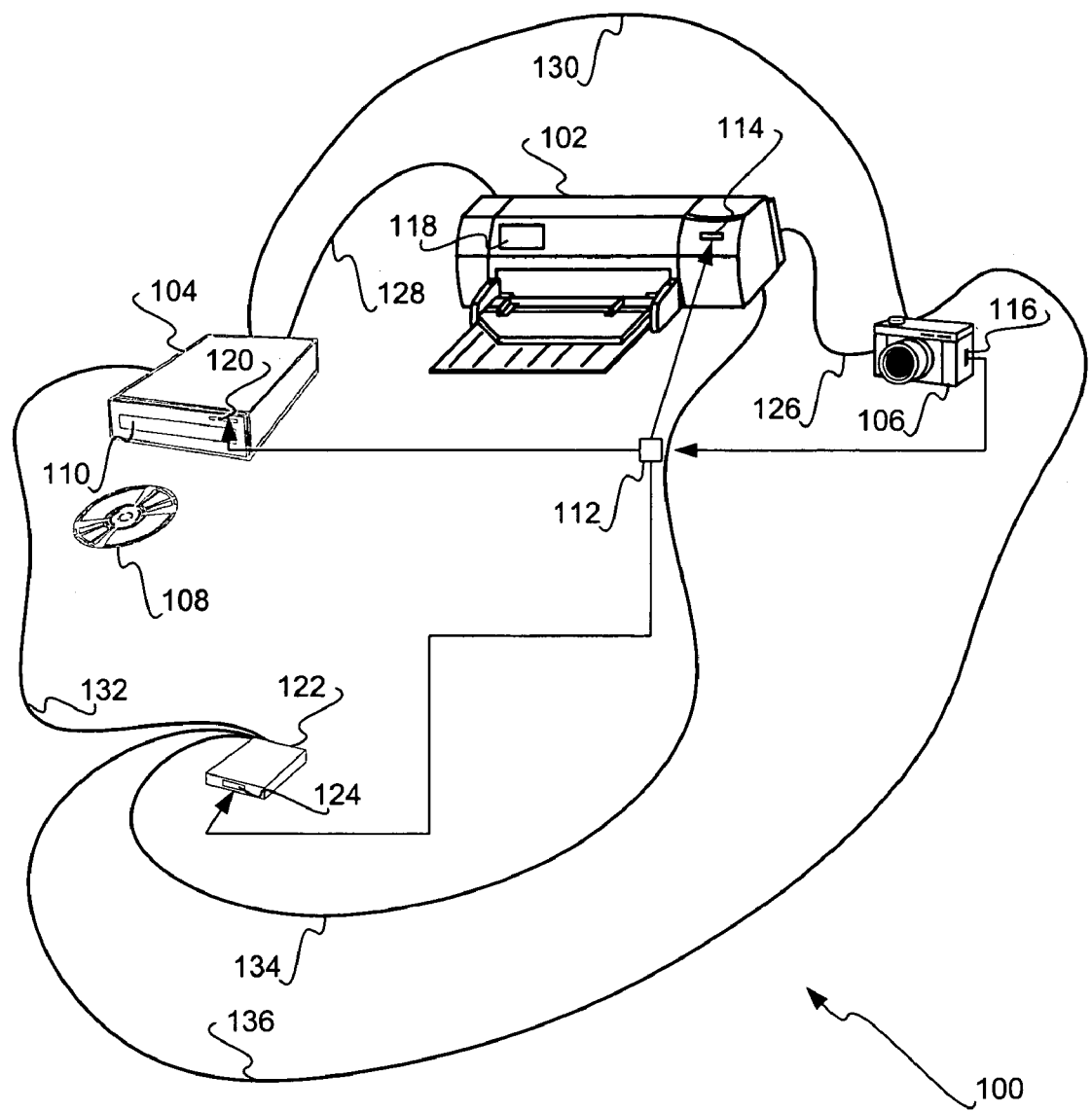
FIG. 1 is a diagram of a system in which image data files and thumbnail images can be optically written to an optical disc without using a general-purpose computing device, according to an embodiment of the invention.

FIG. 1 shows a system 100 in which image data files can be optically written to an optical disc 108 and thumbnail images corresponding to the image data files can be optically written to the optical disc 108, without using a general-purpose computing device, according to an embodiment of the invention. The system 100 includes a printing device 102, an optical storage device 104, a digital camera device 106, and a memory card reader device 122. Not all of the devices depicted in FIG. 1 have to be included in all embodiments of the system 100. For instance, one or more of the printing device 102, the digital camera device 106, and/or the memory card reader device 122 may be absent from particular embodiments of the system 100. As depicted in the embodiment of FIG. 1, the devices 102, 104, 106, and 122 are external from one another, but directly connect to one another.

The printing device 102 is generally a device that forms images on media, such as by ejecting ink or applying toner onto paper or another type of media, and which generally is a process referred to as printing. The printing device 102 may be an inkjet printing device, such as an inkjet printer, a laser printing device, such as a laser printer, or another type of printing device. The printing device 118 optionally includes a display 118, which may be a liquid crystal display (LCD), and also optionally includes a memory card slot 114. The memory card slot 114 when present is part of a memory card reader mechanism of the printing device 118, and is receptive to a memory card 112 on which image data files have been stored. The printing device 102 is capable of printing images stored as image data files on the memory card 112, or received from the digital camera device 106 via the connection 126, from the optical storage device 104 via the connection 128, and/or from the memory card reader device 122 via the connection 134.

The memory card 112 may have a number of different form factors. For instance, the memory card 112 may be a Compact Flash (CF) memory card, a Secure Digital (SD) memory card, a MultiMedia Card (MMC), an eXtreme Digital (XD) picture card, a SmartMedia (SM) card, a Memory Stick memory card, or another type of memory card. The image data files stored on the memory card 112 are data files that each electronically represents an image that has been captured, such as a picture taken by the digital camera device 106. The image data files stored on the memory card 112 may be formatted in accordance with a number of different image file formats. Some more common image file formats include the Graphics Interchange Format (GIF), the Joint Photographic Experts Group (JPEG or JPG) format, the Portable Network Graphics (PNG) format, and the Tagged Image File Format (TIFF or TIF), among other image file formats.

The digital camera device 106 is generally a device that is capable of optically capturing images and electronically storing them on memory as image data files. The memory of the digital camera device 106 may be internal, non-removable memory, and/or it may be the memory card 112 that is insertable into and removable from a memory card slot 116 that is optionally part of a memory card reader mechanism of the device 106. The digital camera device 106 may be able to transmit image data files it captured to the printing device, via the connection 102, to the optical storage device 104, via the connection 130, and/or to the memory card reader device 122, via the connection 136. The digital camera device 106 may also be able to receive image data files for storing on its memory, from the printing device 102, the optical storage device 104, and/or the memory card reader device 122.

In one embodiment, the digital camera device 106 may specifically be a digital video camera device. A digital video camera device records a series of images as a video stream, which may be stored in memory, on an optical computer-readable medium, or on another type of computer-readable medium. Individual still images can be generated from the video stream, where each such image may correspond to a different frame of the video stream.

The memory card reader device 122 is generally a device that is capable of reading data files from the memory card 112 and/or writing data files to the memory card 112, where the memory card 112 has been inserted into the slot 124 of the device 122. These data files can include image data files. The memory card reader device 122 may receive image data files from or send image data files to the printing device 102, via the connection 134, the digital camera device 106, via the connection 136, and/or the optical storage device 104, via the connection 132.

The connections 126, 128, 130, 132, 134, and 136 among the various devices of the system 100 of FIG. 1 may each be wired or wireless connections. Wired connections include serial port connections, parallel port connections, Universal Serial Bus (USB) 1.1 and/or 2.0 connections, FireWire 400 and/or 800 connections, which are also referred to as IEEE 1394A and IEEE 1394B connections, Ethernet 10, 100, and/or 1000 megabits per second (mbps) network connections, as well as other types of wired connections. Wireless connections can include Wi-Fi connections, such as those denoted by the IEEE 802.11a, 802.11b, and/or 802.11g standards, as well as other types of wireless connections. Other types of wireless connections can include infrared connections, such as infrared connections conforming to the Infrared Data Association (IrDA) standard, as well as other types of electro-, optical, and electro-optical connections.

The optical storage device 104 is a device that is capable of optically writing to and/or optically reading from an optical disc 108 inserted into a slot 110 thereof that is part of an optical mechanism of the optical storage device 104. In particular, the optical storage device 104 is capable of optically writing image data files to an optically writable data side of the optical disc 108, and is capable of optically writing, or marking, user-readable thumbnail images to an optically writable label side of the optical disc 108. An example of an optically writable label side of an optical disc is particularly disclosed in the patent application entitled "Integrated CD/DVD Recording and Label", filed on Oct. 11, 2001, and assigned Ser. No. 09/976,877. The optically writable label side of the optical disc 108 may be written to in color and/or in black-and-white or monochrome. The optical storage device 104 can in one embodiment both optically write image data files to the optically writable data side of the optical disc 108, and optically write thumbnail images to the optically writable label side of the optical disc 108, with the same optical mechanism, such as a laser.

The optical storage device 104 may receive the image data files to be written to the optically writable data side of the optical disc 108 in a number of different ways. The optical storage device 104 may receive the image data files from the printing device 102, via the connection 128, from the digital camera device 106, via the connection 130, and/or from the memory card reader device 122, via the connection 132. In addition, the memory card 112 may be inserted into an optional memory card slot 110 that is part of an optional memory card reader mechanism of the optical storage device 104, for the device 104 to retrieve image data files off the memory card 112. In one embodiment of the invention, the optical storage device 104 may be integrated with the printing device 102, and may include an internal (integrated) or external keyboard as well.

The thumbnail images written to the optically writable label side of the optical disc 108 each corresponds to one of the images of the image data files. A thumbnail image itself is generally and non-restrictively defined as a small image representation of a larger image. There may be fewer thumbnail images written to the optically writable label side of the optical disc 108 than there are image data files. For instance, there may be 200 image data files, and just 25 thumbnail images corresponding to 25 of the 200 image data files. The 25 image data files having corresponding thumbnail images may be randomly selected, selected by the user, and/or selected in another manner.

Figure 2A:
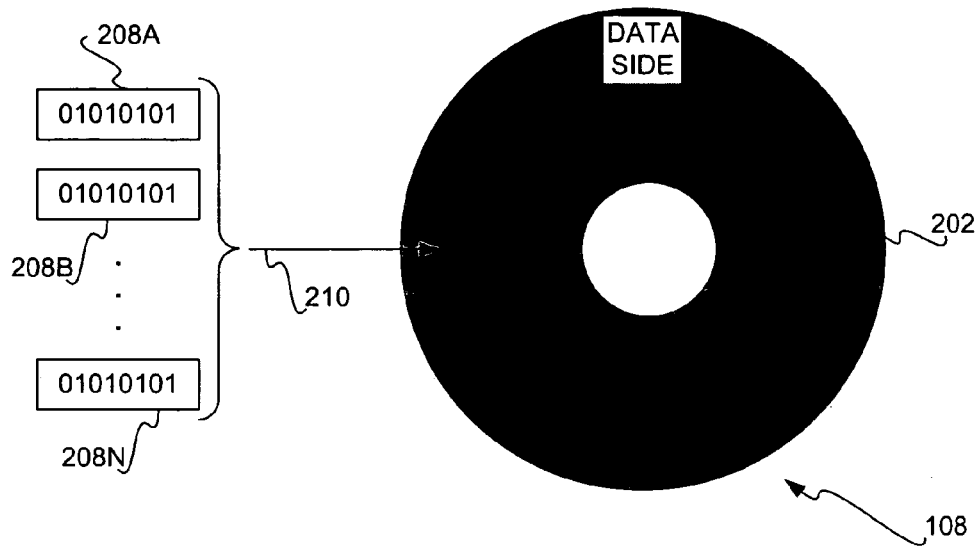
FIG. 2A is a diagram of the optically writable data side of an optical disc, on which image data files can be stored, according to an embodiment of the invention.
Figure 2B:
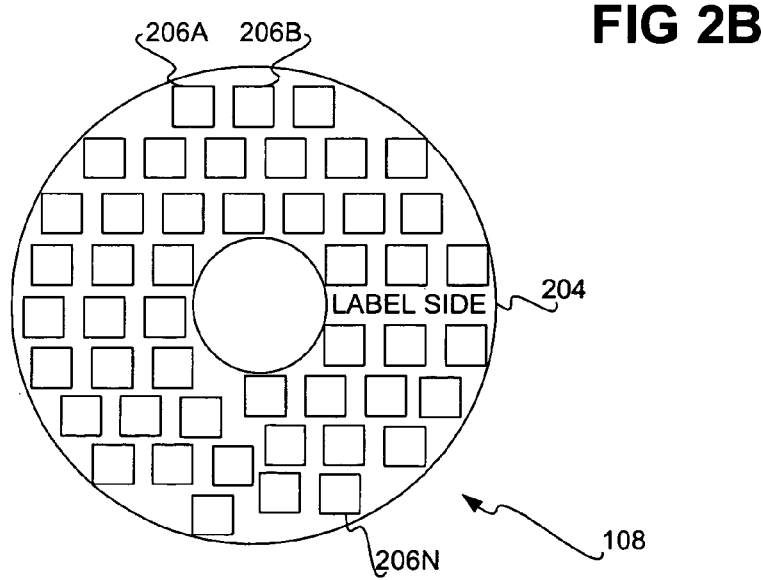
FIG. 2B is a diagram of the optically writable label side of an optical disc, on which thumbnail images can be marked, according to an embodiment of the invention.

FIG. 2A shows the optically writable data side 202 of the optical disc 108 in detail, according to an embodiment of the invention, whereas FIG. 2B shows the optically writable label side 204 of the optical disc 108 in detail, according to an embodiment of the invention. The optical disc 108 may be a compact disc (CD)-type optical disc, a digital versatile disc (DVD)-type optical disc, or another type of optical disc. The optically writable data side 202 of FIG. 2A is on the opposite side of the optically writable label side 204 of FIG. 2B in one embodiment of the invention.

In FIG. 2A, the shading of the optically writable data side 202 of the optical disc 108 is intended to indicate that data, such as image data files, can be optically written to the data side 202. Such data is in a non-user-readable format, and may include image data files 208A, 208B, . . . , 208N, collectively referred to as the image data files 208, and each of which is a sequence of zero and one bits that together encompass the data for a particular image. For instance, the data may be stored on the optically writable data side 202 in a manner consistent with that as to how data is normally stored on CD-R, CD-RW, DVD+R, DVD+RW, DVD-RAM, DVD-RW, and/or DVD-R optical media, as those of ordinary skill within the art can appreciate. The writing of the image data files 208 to the data side 202 is indicated by the arrow 210 in FIG. 2A.

In FIG. 2B, a number of thumbnail images 206A, 206B, . . . , 206N, have been optically marked on or optically written to the optically writable label side 204 of the optical disc 108. There may be more or fewer of the thumbnail images 206 than are shown in FIG. 2B, and the optically writable label side 204 may have other information in addition to and/or in lieu of at least some of the thumbnail images 206 in one embodiment of the invention. The thumbnail images 206 are user-readable in that they are small images optically marked on or optically written to the label side 204. That is, the thumbnail images 206 are not non-user-readable data like the data stored on the data side 202. The images 206 may be optically marked on or optically written to the optically writable label side 202 in a manner consistent with that described in the patent application entitled "Integrated CD/DVD Recording and Label", filed on Oct. 11, 2001, and assigned Ser. No. 09/976,877.

Although the number of thumbnail images 206 is depicted as greater than one in FIG. 2B, in another embodiment of the invention, the thumbnail images 206 may include just one thumbnail image. Such a thumbnail image may in one embodiment be magnified to cover the entire optically writable label side 204 of the optical disc 108. Furthermore, in another embodiment of the invention, there may be text information optically marked on the label side 204. For instance, the user may be afforded an opportunity to enter such text which is then optically marked on the label side 204, especially in conjunction with devices that have integrated or external keyboards by which the user is able to enter text. The text may include titles for the thumbnail images 206, date information regarding when the image files to which the thumbnail images 206 correspond were captured, title information regarding the image files as a whole, as well as other types of information.

Figure 3:
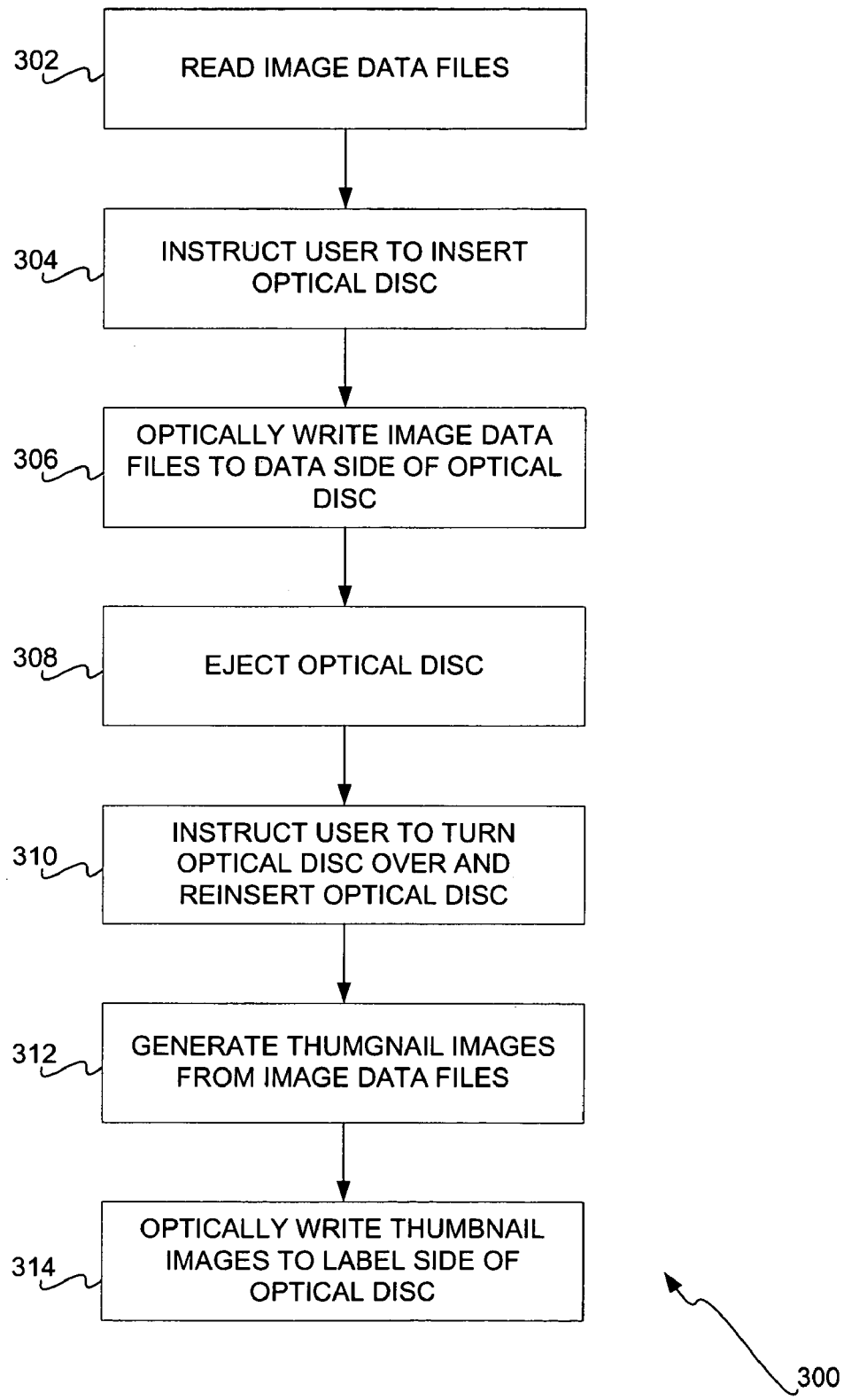
FIG. 3 is a flowchart of a method for optically writing image data files and thumbnail images to an optical disc without using a general-purpose computing device, according to an embodiment of the invention.

FIG. 3 shows a method 300 delineating how the system 100 is able to optically write the image data files 208 and the thumbnail images 206 to the optical disc 108 without using or assistance from a host general-purpose computing device, according to an embodiment of the invention. A general-purpose computing device can be a desktop computer, a laptop or notebook computer, or a handheld computer that is intended to be capable of performing a wide variety of different computational tasks, and that may not be preprogrammed to perform any particular given task. For instance, such a general-purpose computer may be capable of running diverse computer programs installed on the computer, such as word processing programs, spreadsheet programs, Internet web browser programs, email programs, and many other types of programs. A general-purpose computer usually has an operating system preinstalled thereon on or through which other computer programs can run. For instance, many general-purpose computers run versions of the Windows® operating system available from Microsoft Corp., of Redmond, Wash.

Furthermore, such a general-purpose computing device is considered a host computing device where it is intended to control or manage the devices 102, 104, 106, and 122 of the system 100 as peripheral devices to the general-purpose computing device. For instance, where the printing device 102 is connected to such a general-purpose computing device, the computing device is a host device that controls the printing device 102, including send it print jobs to print. As another example, where the optical storage device 104 is connected to such a general-purpose computing device, the computing device is a host device that controls the optical storage device 104, including receiving data from the optical device 104 as read from the optical disc 108, and/or sending data to the optical device 104 to write to the optical disc 108. Thus, the method 300 delineates how the system 100 is able to optically write the image data files 208 and the thumbnail images 206 to the optical disc 108 without assistance from a host general-purpose computing device in that such a general-purpose computing device is not present within the system 100. The method 300 further or alternatively delineates how the system 100 is able to optically write the image data files 208 and the thumbnail images 206 to the optical disc 108 without assistance from a host general-purpose computing device in that such a general-purpose computing device does not control any of the devices 102, 104, 106, and 122 as peripheral devices thereto during performance of the method 300.

The method 300 first includes reading the image data files 208 to be stored on the optically writable data side 202 of the optical disc 108 (302). The image data files 208 may be read from the internal memory of the digital camera device 106. Alternatively, the image data files 208 may be read from the memory card 112. In the latter case, the printing device 102, the optical storage device 104, the digital camera device 106, and/or the memory card reader device 122 may read the image data files 208 from the memory card 112.

The user is instructed to insert the optical disc 108 into the slot 110 of the optical storage device 104 (304). The user may be specifically instructed to insert the optical disc 108 into the slot 110 of the optical storage device 104 with a particular side 202 or 204 of the optical disc 108 in a particular orientation. For instance, the user may be instructed to insert the optical disc 108 into the slot 110 such that the data side 202 faces downwards. The user may be instructed by displaying instructions on the display 118 of the printing device 102. Alternatively, the user may be instructed by displaying instructions on a different display, such as one that may be a part of the optical storage device 104, the digital camera device 106, and/or the memory card reader device 122. The user may be instructed in a manner other than displaying instructions as well, such as via lighting an indicator lamp like a light-emitting diode (LED), emitting voice instructions or sounds, and so on.

The optical storage device 104 writes the image data files retrieved in 302 to the optically writable data side 202 of the optical disc 108 (306). Once the writing process has finished, the optical disc 108 may optionally be ejected from the optical storage device 104 (308). The user is instructed to turn the optical disc 108 over (and first remove the optical disc 108 from the optical storage device 104 if ejection has not been performed), and reinsert the optical disc 108 into the optical storage device 104 (310). Instruction to the user in 310 may be in a similar manner as the instruction to the user in 304.

The thumbnail images 206 are generated from the image data files 208 (312). The thumbnail images 206 may be able to be generated by the optical storage device 104, the printing device 102, the digital camera device 106, and/or the memory card reader device 122. For example, one of these devices may have a computer program stored thereon that is able to perform the method 300. This device may read the image data files 208 in 302, instruct the user to instruct the optical disc 108 in 304, cause the optical storage device 104 to optically write the image data files 208 in 306, generate the thumbnail images 206 in 312, and so on. Once the thumbnail images 206 have been generated, they are optically written to or optically marked on the optically writable label side 204 of the optical disc 108 (314).

As can be appreciated by those of ordinary skill within the art, the ordering of the various acts and/or steps in the method 300 of FIG. 3 is indicative of one embodiment of the invention, and not of all embodiments of the invention. For example, in other embodiments, the thumbnail images 206 may be generated before the image data files 208 are written to the optically writable data side 202 of the optical disc 108. As another example, the thumbnail images 206 may be written to the optically writable label side 204 of the optical disc 108 before the image data files 208 are written to the optically writable data side 202 of the optical disc 108.

Furthermore, the method 300 may have additional steps and/or acts in addition to and/or in lieu of those depicted in FIG. 3 in other embodiments of the invention, and/or certain steps and/or acts depicted in FIG. 3 may be omitted in other embodiments of the invention. For example, the optical storage device 104 may in one embodiment be capable of writing to the optically writable data side 202 of the optical disc 108 and to the optically writable label side 204 of the optical disc 108 without having to have the optical disc 108 turned over. In such an embodiment, 310 would not be performed. As another example, the user may be kept apprised of the status of the optical writing to either or both of the data side 202 and the label side 204, which is an additional step and/or act that is not depicted in FIG. 3.

Furthermore, the method 300 may include steps and/or acts that generate text characters that correspond to information regarding the image data files 208. Such text characters may correspond to the date and/or time that the image data files 208 were captured or generated, their file names, and so on. In addition, another step and/or act that may be included in the method 300 is user selection of a subset of the image data files 208 for which thumbnail images 206 are to be generated, where there are fewer of the thumbnail images 206 in number than the number of the image data files 208.

As has been described, the system 100, by performing the method 300, is able to optically write the image data files 208 to the optically writable data side 202, and to optically write or optically mark the thumbnail images 206 to or on the optically writable label side 204, without assistance from a host general-purpose computing device. No host general-purpose computing device is employed or used in the system 100 and in the method 300. A computer program may be built into one or more of the devices 102, 104, 106, and 122 of the system 100 to perform the method 300. Where the computer program is part of one of the devices of system 100 other than the optical storage device 104, 306 and 314 of the method 300 are specifically performed by causing the optical storage device 104 to do the optical writing acts or steps indicated in 306 and 314, since the other devices 102, 106, and 122 cannot by themselves actually optically write.

Optical Storage Device, Digital Camera Device, and Printing Device

Figure 4:
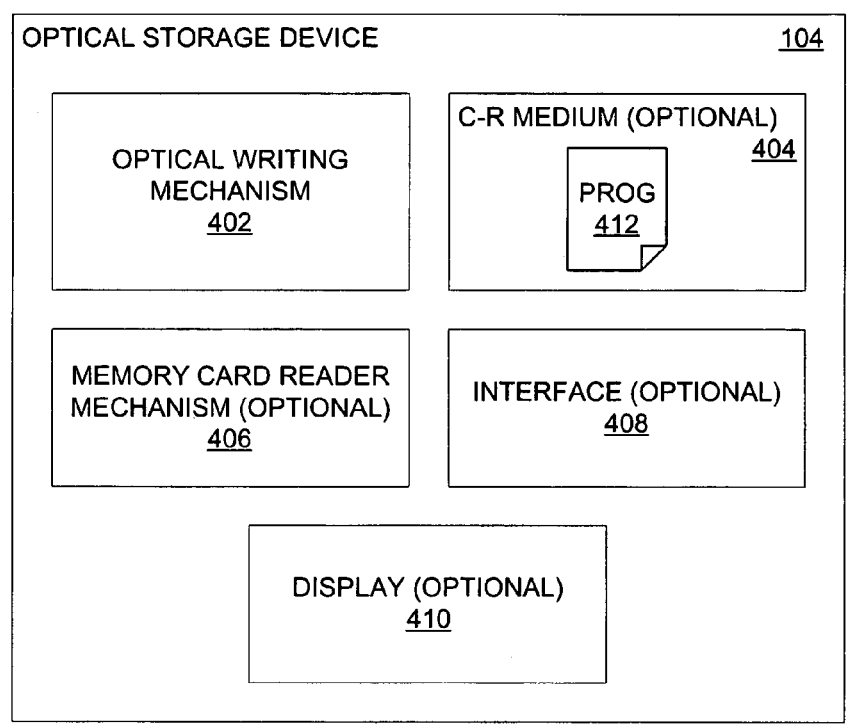
FIG. 4 is a block diagram of an optical storage device, according to an embodiment of the invention.

FIG. 4 shows a block diagram of the optical storage device 104, according to a particular embodiment of the invention. The optical storage device 104 in FIG. 4 includes an optical writing mechanism 402, and optionally a computer-readable medium 404, a memory card reader mechanism 406, an interface 408, and a display 410. The optical storage device 104 may include components and/or mechanisms in addition to and/or in lieu of those depicted in FIG. 4 as well. The mechanisms 402 are internal to the device 104.

The optical writing mechanism 402 includes those components for the optical storage device 104 to optically write the image data files 208 to the optically writable data side 202 of the optical disc 108, and to optically mark or optically write the thumbnail images 206 on or to the optically writable label side 204 of the optical disc 108. As such, the optical writing mechanism 402 may include an optical pick-up unit (OPU), an optical beam generator, one or more lenses, one or more motors, as well as other components. The optical writing mechanism 402 may also be able to read data from the optically writable data side 202 and/or the optically writable label side 204 of the optical disc 108. The optical writing mechanism 402 may also be referred to as an optical storage mechanism.

The computer-readable medium 404 may be volatile or non-volatile, and may be or include semiconductor media, optical media, and/or magnetic media in one embodiment of the invention. The computer-readable medium 404 stores a computer program 412. Where the computer-readable medium 404 and the computer program 412 are present in the optical storage device 104, the computer program 412 may perform the method 300 that has been described. For instance, the computer program 412 may instruct the user to perform certain actions, read the image data files 208, generate the thumbnail images 206, and so on.

The memory card reader mechanism 406 includes those components for the optical storage device 104 to read the memory card 112 when inserted into the optical storage device 104. For instance, the mechanism 406 may include the slot 120 into which the memory card 112 is inserted. The memory card mechanism 406 may be included so that the image data files 208 can be directly read from the memory card 112, written to the optically writable data side 202 of the optical disc 108, and the thumbnail images 206 corresponding thereto written to the optically writable label side 204 of the optical disc 108, without assistance from any other device.

The interface 408 includes those components for the optical storage device 104 to communicatively connect in a wireless or wired manner to the printing device 102, the digital camera device 106, and/or the memory card reader device 122. That is, the interface 408 allows the connections 128, 130, and 132 to be realized from the perspective of the optical storage device 104. The display 410 may be a liquid crystal display (LCD), one or more light-emitting diodes (LED's), or another type of display. The display 410 may display the instructions to be presented to the user that have been described as a part of the method 300.

Figure 5:
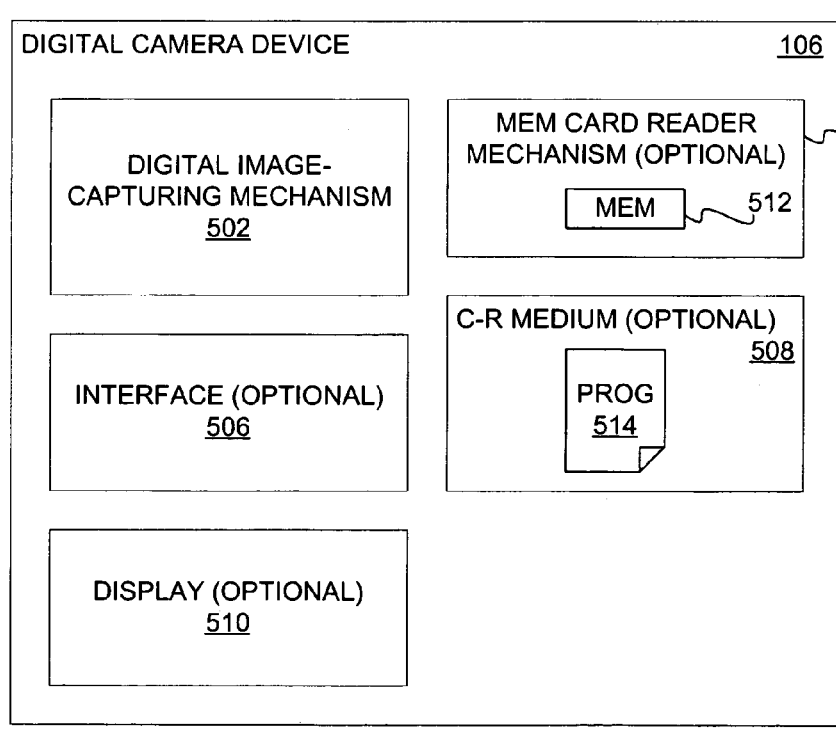
FIG. 5 is a block diagram of a digital camera device, according to an embodiment of the invention.

FIG. 5 shows a block diagram of the digital camera device 106, according to a particular embodiment of the invention. The digital camera device 106 in FIG. 5 includes a digital image-capturing mechanism 502, and optionally a memory card reader mechanism 504, an interface 506, a computer-readable medium 508, and a display 510. The digital camera device 106 may include components and/or mechanism in addition to and/or in lieu of those depicted in FIG. 5 as well. The mechanisms 502 and 504 are internal to the device 106.

The image-capturing mechanism 502 includes those components for the digital camera device 106 to capture an image electronically. For instance, the image-capturing mechanism 502 may include one or more lenses, optical or electronic viewfinders, as well as a charge-coupled device (CCD) or another device that senses light and generates electronic signals in response thereto. The image-capturing mechanism 502 stores the images captured as the image data files 208 on the memory 512. The memory 512 may be internal, non-removable memory of the digital camera device 106.

Additionally or alternatively, the memory 512 may be the removable memory card 112 that is insertable into and removable from the optional memory card reader mechanism 504. The memory card reader mechanism 504 thus includes those components for the digital camera device 106 to write to and/or read from the memory card 112 when inserted into the digital camera device 106. For instance, the memory card reader mechanism 504 may include the slot 116 into which the memory card 112 is inserted. The interface 506 includes those components for the digital camera device 106 to communicatively connect in a wireless or wired manner to the printing device 102, the digital camera device 106, and/or the memory card reader device 122. That is, the interface 506 allows the connections 126, 130, and 136 to be realized from the perspective of the digital camera device 106.

The computer-readable medium 508 may be volatile or non-volatile, and may be or include semiconductor media, optical media, and/or magnetic media in one embodiment of the invention. The computer-readable medium 508 stores a computer program 514. Where the computer-readable medium 508 and the computer program 514 are present in the digital camera device 106, the computer program 514 may perform the method 300 that has been described. For instance, the computer program 514 may instruct the user to perform certain actions; read the image data files 208, generate the thumbnail images 206, and so on. The display 510 may be an LCD, one or more LED's, or another type of display. The display 510 may display the instructions to be presented to the user that have been described as a part of the method 300.

Figure 6:
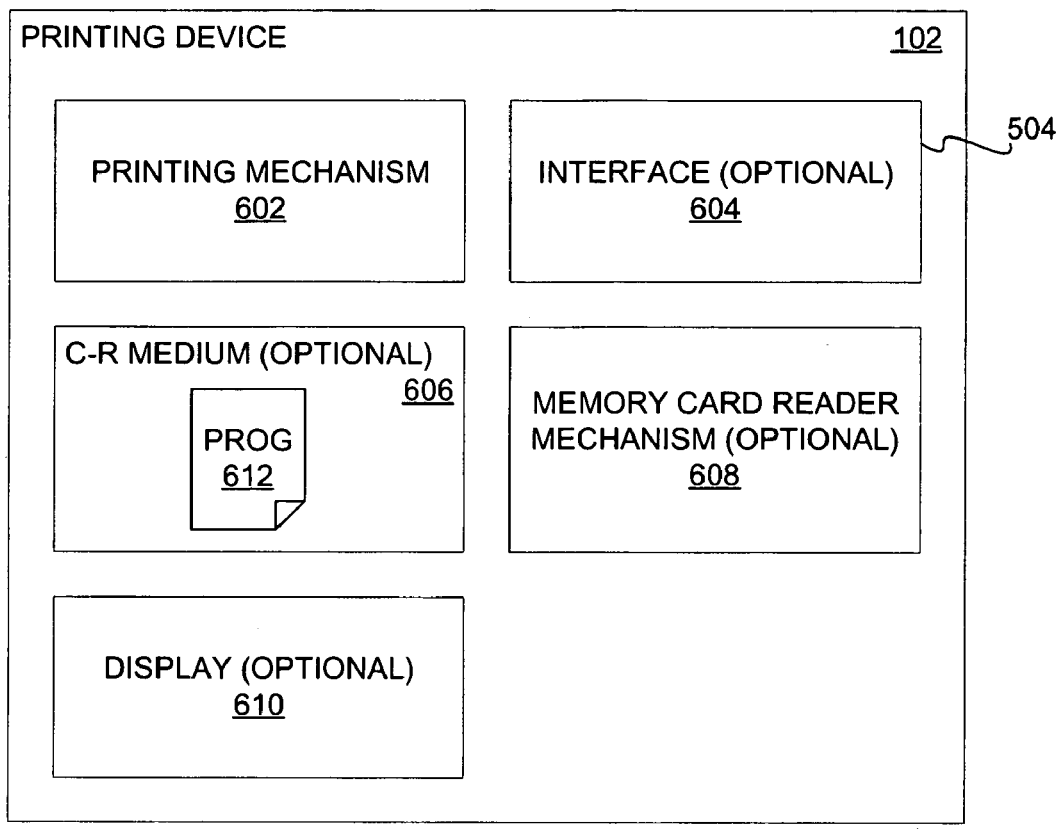
FIG. 6 is a block diagram of a printing device, according to an embodiment of the invention.

FIG. 6 shows a block diagram of the printing device 102, according to a particular embodiment of the invention. The printing device 102 includes a printing mechanism 602, and optionally an interface 604, a computer-readable medium 606, a memory card reader mechanism 608, and a display 610. The printing device 102 may include components and/or mechanisms in addition to and/or in lieu of those depicted in FIG. 6 as well. The mechanisms 602 and 608 are internal to the printing device 102.

The printing mechanism 602 includes those components for the printing device 602 to output images onto media, in a process generally referred to as printing. For instance, the printing device 102 may be an inkjet printing device, such that the printing mechanism 602 includes ink ejection printheads, ink supplies, and so on, to inkjet print onto media like paper. As another example, the printing device 102 may be a laser printing device, such that the printing mechanism 602 includes a laser or an array of LED's, a supply of toner, a fuser, an electrostatic drum, and so on, to laser print onto media like paper.

The interface 604 includes those components for the printing device 102 to communicatively connect in a wireless or wired manner to the optical storage device 104, the digital camera device 106, and/or the memory card reader device 122. That is, the interface 604 allows the connections 128, 126, and 134 to be realized from the perspective of the printing device 102. The computer-readable medium 606 may be volatile or non-volatile, and may be or include semiconductor media, optical media, and/or magnetic media in one embodiment of the invention. The computer-readable medium 606 stores a computer program 612. Where the computer-readable medium 606 and the computer program 612 are present in the printing device 102, the computer program 612 may perform the method 300 that has been described. For instance, the computer program 612 may instruct the user to perform certain actions, read the image data files 208, generate the thumbnail images 206, and so on.

The memory card reader mechanism 608 includes those components for the printing device 102 to read the memory card 112 when inserted into the optical storage device 104. For instance, the mechanism 608 may include the slot 114 into which the memory card 112 is inserted. The display 610 may be an LCD, one or more LED's, or another type of display. The display 610 may display the instructions to be presented to the user that have been described as a part of the method 300.

CONCLUSION

It is noted that, although specific embodiments have been illustrated and described herein, it will be appreciated by those of ordinary skill in the art that any arrangement calculated to achieve the same purpose may be substituted for the specific embodiments shown. For instance, whereas embodiments of the invention have been described in relation to a printing device 102, an optical storage device 104, and a digital camera device 106, in other embodiments of the invention, one or more of the functionalities performed by these devices may be integrated into a single device. As one example, the printing functionality of the printing device 102 may be integrated with the optical writing functionality of the optical storage device 104 within a single device. As another example, the optical data and label writing functionality of optical storage device 104 may be integrated with the image capture functionality of digital camera 106 within a single device. Furthermore, a device according to an embodiment of the invention may include an internal or external keyboard by which text entry is accomplished by the user. This application is intended to cover any adaptations or variations of the disclosed embodiments of the present invention. Therefore, it is manifestly intended that this invention be limited only by the claims and equivalents thereof.

I claim:

1. A method comprising:
  optically writing a plurality of image data files on an optically writable data side of an optical disc;
  optically marking at least one thumbnail image on an optically writable label side of the optical disc, each thumbnail image corresponding to one of the image data files; and,
  after optically writing the plurality of image data files on the optically writable data side of the optical disc and before optically marking the at least one thumbnail image on the optically writable label side of the optical disc, instructing a user to turn the optical disc over and reinsert the optical disc into an optical storage device capable of performing the optical writing and the optical marking.

2. The method of claim 1, wherein optically writing the plurality of image data files and optically marking the at least one thumbnail image are performed without assistance from a host general-purpose computing device.

3. The method of claim 2, wherein optically writing the plurality of image data files and optically marking the at least one thumbnail image are performed by an optical storage device external to and directly connected to one of: a digital camera device and a printing device.

4. The method of claim 2, wherein optically writing the plurality of image data files and optically marking the at least one thumbnail image are performed by a device having an internal optical storage mechanism and an internal printing mechanism.

5. The method of claim 2, wherein optically writing the plurality of image data files and optically marking the at least one thumbnail image are performed by a device having an internal optical storage mechanism and an internal memory card reading mechanism.

6. The method of claim 1, wherein instructing the user to turn the optical disc over and reinsert the optical disc into the optical storage device comprises displaying instructions to turn the optical disc over and reinsert the optical disc into the optical storage device on a display mechanism of one of: the optical storage device, a digital camera device, and a printing device.

7. The method of claim 1, further comprising initially instructing a user to insert the optical disc into an optical storage device capable of performing the optical writing and the optical marking.

8. The method of claim 1, further comprising initially reading the plurality of image data files from a memory.

9. The method of claim 8, wherein reading the plurality of image data files from the memory comprises reading the plurality of image data files from the memory of one of a digital camera device, a memory card reader device, and a printing device.

10. The method of claim 1, further comprising generating the at least one thumbnail image.

11. The method of claim 10, wherein generating the at least one thumbnail image comprises generating the at least one thumbnail image by one of a digital camera device, an optical storage device, and a printing device.

12. The method of claim 1, further comprising selecting at least one of the image data files for which corresponding ones of the thumbnail images are generated.

13. The method of claim 1, wherein the plurality of image data files are optically written on the optically writable data side of the optical disc with a same laser with which the at least one thumbnail image are optically marked on the optically writable label side of the optical disc.

14. A system comprising:
an optical storage device capable of optically writing to an optically writable data side of an optical disc and to an optically writable label side of the optical disc;
a mechanism communicatively connected to the optical storage device to retrieve a plurality of image data files from memory, to cause the optical storage device to write the image data files to the optically writable data side of the optical disc, and to cause the optical storage device to mark a plurality of thumbnail images on the optically writable label side of the optical disc, without assistance from a host general-purpose computing device; and,
a display, where the mechanism is further to instruct the user on the display to insert the optical disc into the optical storage device, and where the mechanism is to instruct the user on the display to turn the optical disc over and reinsert the optical disc into the optical storage device after the image data files have been written to the optically writable data side of the optical disc and before the thumbnail images have been marked on the optically writable label side of the optical disc, or after the thumbnail images have been marked on the optically writable label side of the optical disc and before the image data files have been written on the optically writable data side of the optical disc,
wherein each thumbnail image corresponds to one of the image data files, and
wherein the plurality of image data files are optically written on the optically writable data side of the optical disc with a same laser with which the at least one thumbnail image are optically marked on the optically writable label side of the optical disc.

15. The system of claim 14, wherein the mechanism communicatively connected to the optical storage device is part of one of a digital camera device, a memory card reader device, and a printing device.

16. The system of claim 14, wherein the mechanism is part of the optical storage device.

17. The system of claim 14, wherein the mechanism is further to generate the thumbnail images from the image data files to which the thumbnail images correspond.

18. The system of claim 17, wherein the mechanism is further to read the image data files from the memory prior to generating the thumbnail images therefrom.

19. The system of claim 14, wherein the display is part of one of the optical storage device and the mechanism.

20. An optical storage device comprising:
an optical writing mechanism capable of optically writing to an optically writable data side of an optical disc in an electro-optically readable form and to an optically writable label side of the optical disc inserted into the optical storage device in a visually readable form with one laser;
a computer-readable medium having a computer program stored thereon to cause the optical writing mechanism to write image data files to the optically writable data side of the optical disc and to write thumbnail images on the optically writable label side of the optical disc, each thumbnail image corresponding to one of the image data files; and,
a display, the computer program to instruct a user on the display to turn the optical disc over and reinsert the optical disc into the optical storage mechanism after the image data files have been written to the optically writable data side of the optical disc and before the thumbnail images have been written to the optically writable label side of the optical disc, or after the thumbnail images have been written to the optically writable label side of the optical disc and before the image data files have been written to the optically writable data side of the optical disc.

21. The optical storage device of claim 20, wherein the computer program is further to generate the thumbnail images from the image data files to which the thumbnail images correspond.

22. The optical storage device of claim 20, further comprising a memory card reader mechanism into which a memory card is insertable, the computer program to read the image data files as stored on the memory card.

23. The optical storage device of claim 20, further comprising an interface to communicatively connect the optical storage device to at least one of a digital camera device, a memory card reader device, and a printing device, the computer program to receive the image data files over the interface.

24. The optical storage device of claim 20, wherein the computer program is further to instruct a user on a display of one of a digital camera device, a memory card reader device, and a printing device to turn the optical disc over and reinsert the optical disc into the optical storage mechanism after the image data files have been written to the optically writable data side of the optical disc or the thumbnail images have been written to the optically writable label side of the optical disc.

25. A digital camera comprising:
a digital image-capturing mechanism to capture a plurality of images;
a memory to store the plurality of images as a plurality of image data files;
an interface to communicatively connect to at least one of a printing device, a memory card reader device, and an optical storage device; and,
a computer-readable medium having a computer program stored thereon to cause the optical storage device to write the image data files to an optically writable data side of an optical disc and to mark a plurality of thumbnail images on the optically writable label side of the optical disc, each thumbnail image corresponding to one of the image data files, wherein the computer program is further to instruct a user on a display to turn the optical disc over and reinsert the optical disc into the optical storage device after the image data files have been written to the optically writable data side of the optical disc and before the thumbnail images have been marked on the optically writable label side of the optical disc, or after the thumbnail images have been marked on the optically writable label side of the optical disc and before the image data files have been written to the optically writable data side of the optical disc.

26. The digital camera of claim 25, wherein the computer program is further to generate the thumbnail images from the image data files to which the thumbnail images correspond.

27. The digital camera of claim 25, further comprising a memory card reader mechanism into which a card of which the memory is a part is insertable, the computer program to read the image data files as stored on the memory of the card.

28. The digital camera of claim 25, wherein the memory is part of a card insertable into the memory card reader device.

29. The device of claim 25, wherein the computer program is further to generate the thumbnail images from the image data files to which the thumbnail images correspond.

30. The device of claim 25, wherein the plurality of images are captured as a video stream.

31. The device of claim 25, wherein the device is a digital video camcorder.

32. A printing device comprising:
a printing mechanism to output images onto media;
an interface to communicatively connect to at least one of a digital camera device, a memory card reader device, and an optical storage device; and,
a computer-readable medium having a computer program stored thereon to cause the optical storage device to write image data files to an optically writable data side of an optical disc and to mark a plurality of thumbnail images on the optically writable label side of the optical disc, each thumbnail image corresponding to one of the image data files,
wherein the computer program is further to instruct a user on a display to turn the optical disc over and reinsert the optical disc into the optical storage device after the image data files have been written to the optically writable data side of the optical disc and before the thumbnail images have been marked on the optically writable label side of the optical disc, or after the thumbnail images have been marked on the optically writable label side of the optical disc and before the image data files have been written to the optically writable data side of the optical disc.

33. The printing device of claim 32, wherein the computer program is further to generate the thumbnail images from the image data files to which the thumbnail images correspond.

34. The printing device of claim 32, wherein the computer program is to retrieve the image data files from the digital camera device over the interface.

35. The printing device of claim 32, further comprising a memory card reader mechanism into which a memory card is insertable, the computer program to read the image data files as stored on the memory card.

36. A device comprising:
a memory card reader mechanism into which a memory card having a plurality of image data files stored thereon is insertable;
an optical writing mechanism capable of optically writing to an optically writable data side of an optical disc and to an optically writable label side of the optical disc inserted into the optical storage device;
a computer-readable medium having a computer program stored thereon to retrieve the image data files from the memory card, and to cause the optical writing mechanism to write image data files to the optically writable data side of the optical disc and to write thumbnail images on the optically writable label side of the optical disc, each thumbnail image corresponding to one of the image data files; and,
a display, the computer program to instruct a user on the display to turn the optical disc over and reinsert the optical disc into the optical storage mechanism after the image data files have been written to the optically writable data side of the optical disc and before the thumbnail images have been written to the optically writable label side of the optical disc, or after the thumbnail images have been written to the optically writable label side of the optical disc and before the thumbnail images have been written to the optically writable label side of the optical disc.

37. The device of claim 36, wherein the plurality of image data files are optically written on the optically writable data side of the optical disc with a same laser with which the at least one thumbnail image are optically marked on the optically writable label side of the optical disc.

38. A non-transitory computer-readable medium having a computer program stored thereon comprising:
a code segment to cause an optical storage device to optically write a plurality of image data files on an optically writable data side of an optical disc;
a code segment to generate a plurality of thumbnail images, each thumbnail image corresponding to one of the image data files;
a code segment to cause the optical storage device to optically mark the plurality of thumbnail images on an optically writable label side of the optical disc; and,
a code segment to instruct the user to turn the optical disc over and reinsert the optical disc into the optical storage device, after the image data files have been optically written on the optically writable data side and before the thumbnail images have been optically written on the optically writable label side, or after the thumbnail images have been optically written on the optically writable label side and before the image data files have been optically written on the optically writable data side.

39. The medium of claim 38, the computer program further comprising a code segment to instruct a user to insert the optical disc into the optical storage device.

40. The medium of claim 38, the computer program further comprising a code segment to read the image data files from a memory.

41. A device comprising:
a digital image-capturing mechanism to capture a plurality of images;
an optical storage device to store the plurality of images as a plurality of image data files;
an interface to communicatively connect to at least one of a printing device a memory card reader device; and,
a computer-readable medium having a computer program stored thereon to cause the optical storage device to write image data files corresponding to one or more of the plurality of images to an optically writable data side of an optical disc and to mark a plurality of thumbnail images on the optically writable label side of the optical disc, each thumbnail image corresponding to one of the image data files, wherein the computer program is to instruct a user to turn the optical disc over and reinsert the optical disc into the optical storage device, after the image data files have been written on the optically writable data side of the optical disc, and before the thumbnail images have been written on the optically writable label side of the optical disc.

42. A method comprising:

optically writing a plurality of image data files on an optically writable data side of an optical disc with a laser;

optically marking at least one thumbnail image on an optically writable label side of the optical disc with the laser, each thumbnail image corresponding to one of the image data files;

one of:

after optically writing the plurality of image data files on the optically writable data side of the optical disc and before optically marking the at least one thumbnail image on the optically writable label side of the optical disc, instructing a user to turn the optical disc over and reinsert the optical disc into an optical storage device of which the laser is a part; and, after optically marking the at least one thumbnail image on the optically writable label side of the optical disc and before optically writing the plurality of image data files on the optically writable data side of the optical disc, instructing a user to turn the optical disc over and reinsert the optical disc into an optical storage device of which the laser is a part.

* * * * *